United States Patent [19]

McGrane

[11] Patent Number: 5,947,500
[45] Date of Patent: Sep. 7, 1999

[54] CYCLE FRAME ASSEMBLY

[76] Inventor: Damian McGrane, 16 Harveyhouse, Green Dragon Lane, Brentford, Middlesex TW8 ODH, United Kingdom

[21] Appl. No.: 08/804,157

[22] Filed: Feb. 20, 1997

[30] Foreign Application Priority Data

Feb. 23, 1996 [GB] United Kingdom .................. 9603916

[51] Int. Cl.⁶ .................................................. B62K 15/00
[52] U.S. Cl. ........................................................ 280/287
[58] Field of Search .............................. 280/287, 281.1, 280/288.3

[56] References Cited

U.S. PATENT DOCUMENTS

| | | | |
|---|---|---|---|
| 4,448,435 | 5/1984 | Hon | 280/287 |
| 4,824,130 | 4/1989 | Chiu | 280/287 |
| 5,351,980 | 10/1994 | Huang | 280/287 |
| 5,440,948 | 8/1995 | Cheng | 280/287 |

FOREIGN PATENT DOCUMENTS

| | | | |
|---|---|---|---|
| A-197163 | 10/1986 | European Pat. Off. | B62K 15/00 |
| A-229597 | 7/1987 | European Pat. Off. | B62K 15/00 |
| 460623 | 12/1950 | Italy | 280/287 |
| 647694 | 12/1950 | United Kingdom . | |
| 1603329 | 11/1981 | United Kingdom | B62K 15/00 |
| A-2232131 | 5/1990 | United Kingdom | B62K 15/00 |

*Primary Examiner*—Lanna Mai
*Assistant Examiner*—Avraham H. Lerner
*Attorney, Agent, or Firm*—Caesar, Rivise, Bernstein, Cohen & Pokotilow, Ltd.

[57] ABSTRACT

A bicycle frame has a hinge joint in the column for the handle bars, arranged so that the column is folded to cause the handlebars to be near the pedals, whereby the bicycle is compact for storage and transport.

13 Claims, 6 Drawing Sheets

CYCLE FRAME ASSEMBLY

This application claims priority of British Patent Application No. 9603916.9, filed on Feb. 23, 1996. A certified copy of said document is attached.

The invention relates to collapsible cycle frame assemblies and cycles (particularly bicycles) incorporating such frame assemblies which are of the type called mountain bikes. It is one object of the invention to provide a cycle frame suitable for a bike which is attractive to ride and yet which can be collapsed to a compact in storage condition.

In one aspect the invention provides a collapsible cycle frame assembly comprising:

a) a front fork assembly having front forks and a tubular stem extending upwardly from said front forks, said tubular stem comprising a first tubular socket for slidably receiving a head tube assembly;

b) a frame, said frame comprising an inclined down tube, said down tube having a forward upper end connected to a generally upright tube for receiving said stem of said front fork assembly and having a rearward lower end connected to a generally upright seat tube, said seat tube comprising a second tubular socket for receiving a seat post assembly;

c) a head tube assembly having first and second ends and a length adjacent said first end which is slidably receivable in and clampable in said first tubular socket, said length including a pivot joint, and d) first releasable clamping means for releasably clamping said length in said first tubular socket, said head tube assembly being upwardly slidable to a position in which said pivot joint is lifted out of said first tubular socket on releasing said first releasable clamping means.

Preferably the range of pivoting of said pivot joint is sufficient to enable the head tube assembly to incline downwardly to extend generally alongside said down tube when said pivot joint is lifted out of said second tubular socket.

Preferably said head tube assembly carries handlebars at said second end and the distance between said pivot joint and said second end is substantially equal to the length of said down tube.

Preferably said releasable clamping means comprises camming means for circumferentially tightening the clamping means around said tubular stem, said camming means being coupled to a quick release lever.

In another aspect the invention provides a collapsible cycle frame assembly comprising:

a) a frame, said frame comprising an inclined down tube, said down tube having a forward upper end connected to a generally upright tube for receiving said stem of said front fork assembly and having a rearward lower end connected to a generally upright seat tube, said seat tube comprising a second tubular socket for receiving a seat post assembly;

b) a seat post assembly having first and second ends and a length adjacent said first end which is slidably receivable in and clampable in said second tubular socket, said length including a pivot joint, and c) fourth releasable clamping means for releasably clamping said length in said second tubular socket, said seat post assembly being upwardly slidable to a position in which said pivot joint is lifted out of said second tubular socket on releasing said fourth releasable clamping means.

The invention also provides a collapsible cycle comprising:

a) a front fork assembly having front forks and a tubular stem extending upwardly from said front forks, said tubular stem comprising a first tubular socket for slidably receiving a head tube assembly;

b) a frame, said frame comprising an inclined down tube, said down tube having a forward upper end connected to a generally upright tube for receiving said stem of said front fork assembly and having a rearward lower end connected to a generally upright seat tube, said seat tube comprising a second tubular socket for receiving a seat post assembly;

c) a head tube assembly having first and second ends and a length adjacent said first end which is slidably receivable in and clampable in said first tubular socket, said length including a pivot joint, and d) first releasable clamping means for releasably clamping said length in said first tubular socket, said head tube assembly being upwardly slidable to a position in which said pivot joint is lifted out of said first tubular socket on releasing said first releasable clamping means.

e) a seat post assembly, said seat post assembly comprising an upper length of tubing telescopically received within a lower length of tubing, said lower length being received within said second tubular socket, second releasable clamping means for releasably securing said second length to said first length and third releasable clamping means for releasably securing said lower length in said second tubular socket, said seat post assembly carrying a saddle;

f) a front wheel mounted in said fork assembly;

g) handlebars mounted on said second end of said head tube assembly;

h) a rear wheel mounted on said frame rearwardly of said seat tube;

i) chainwheel drive means coupled to said rear wheel, and j) pedalling means mounted on said chainwheel drive means.

In order that the invention may be well understood it will now be described by way of example with reference to the accompanying drawings in which.

The bicycle comprises a frame F, two wheels W1 and W2, and the usual chain drive comprising chainwheel CW linked by a chain C to a sprocket wheel SW on the rear axle pedals P (which are foldable inwardly to lie parallel to the plane of the frame, gears (not shown) and other conventional components. For convenience bicycle parts which are well known will not be described in detail. The frame is made up of hollow metal tubing and comprises a down tube F1 at the forward end of which is a socket 1 to receive a fork assembly 15 which includes a central stem 16 which projects through the socket 1 and in the riding configuration shown is clamped to the head tube assembly F2 by a quick release clamp 7, as will subsequently be described. At the rear end a top tube F4 there is a socket 2 to receive the seat post assembly F3. The usual seat stays (3) are welded to the frame beyond the socket 2. The short top tube F4 extends between the seat tube socket 2 and a forward position along the down tube F1.

The seat post assembly F3 is made up of two telescopic lengths of steel tubing 4,5, of length $l_1$ and $l_2$ respectively and diameter $\emptyset_1$ and $\emptyset_2$ respectively. Preferably $l_1$=330 mm, $l_2$=440 mm, $\emptyset_1$=35 mm and $\emptyset 2$=30 mm. The seat 6 is mounted on top of the inner length 5. Quick release clamp devices 7 are present to determine the extent to which the lengths can telescope and extend through the socket 2.

Figure 3:
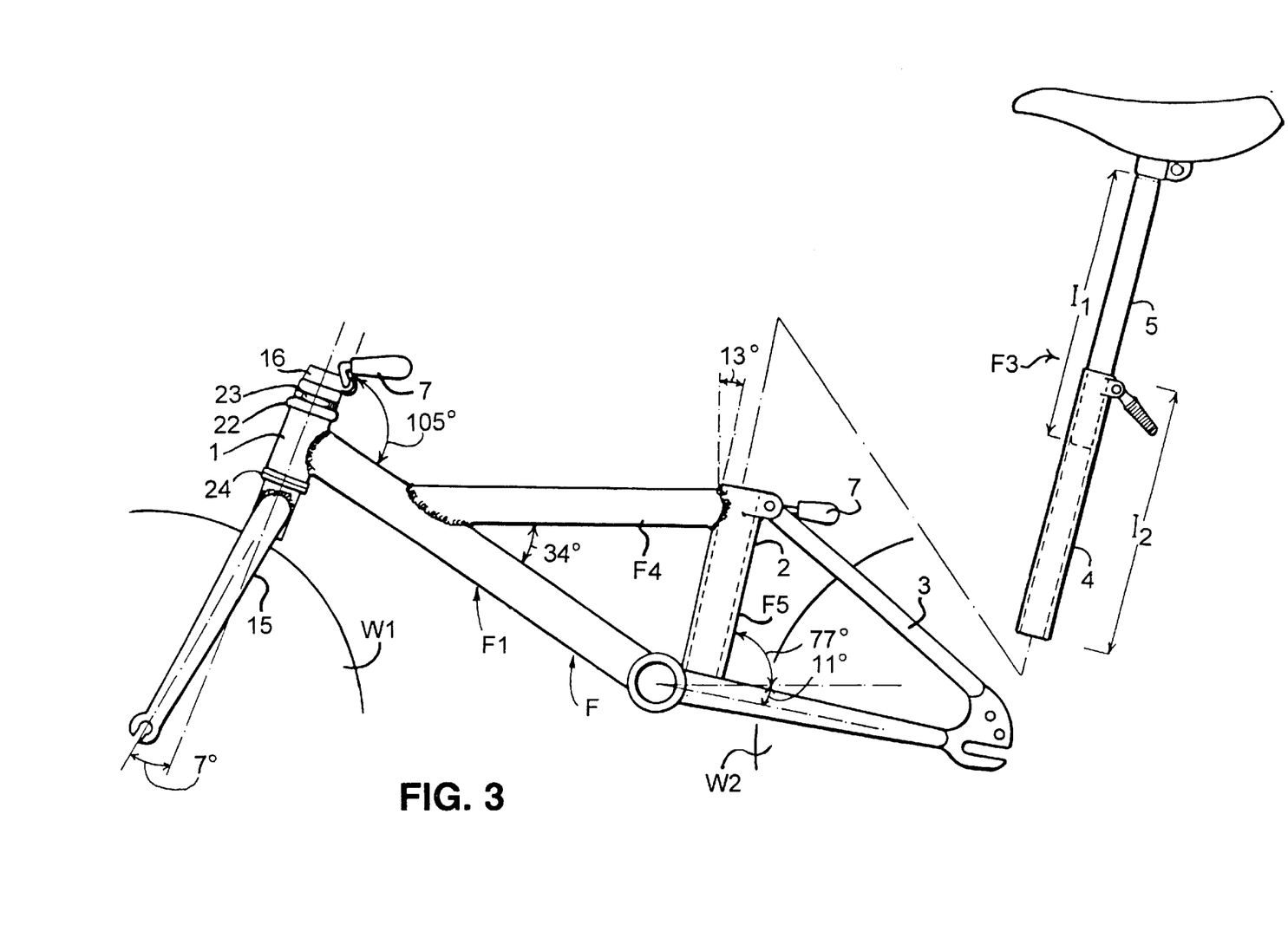
FIG. 3 is a more detailed side elevation of the frame assembly showing the seat post assembly.
Figure 3A:
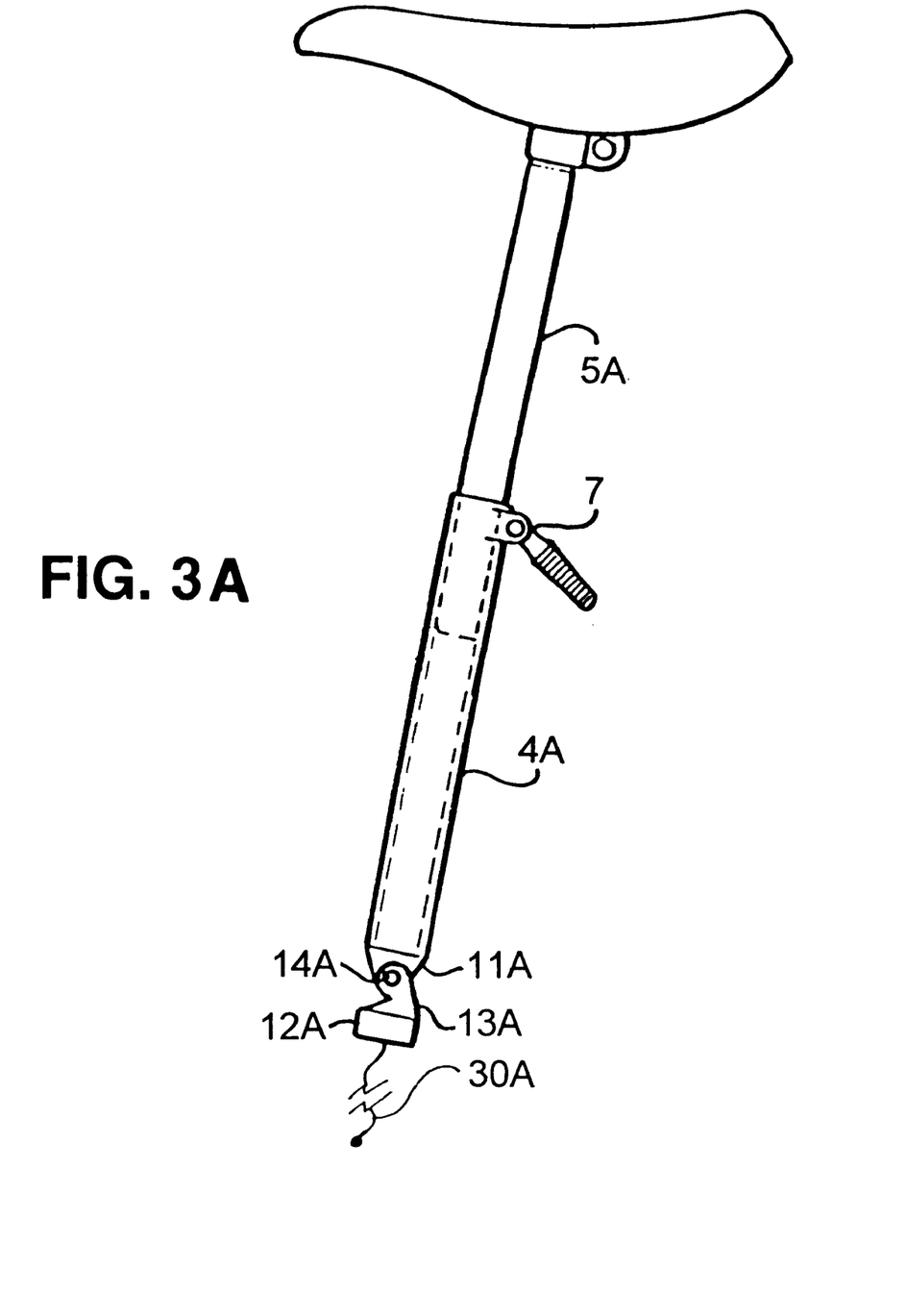
FIG. 3a is a side elevation of an alternative seat post assembly.

In a variant as shown in FIG. 3A, the lower tube 4A of the seat post assembly is pivoted at 14A to a short stub 12A carrying side arms 13A to lie on either side of plate 11A attached to tube 4A. Stub 12A is attached to a steel cord 30A whose free end is expanded and is fixed through a suitable aperture in seat tube F5 to prevent withdrawal of stub 12A from socket 2.

Figure 2:
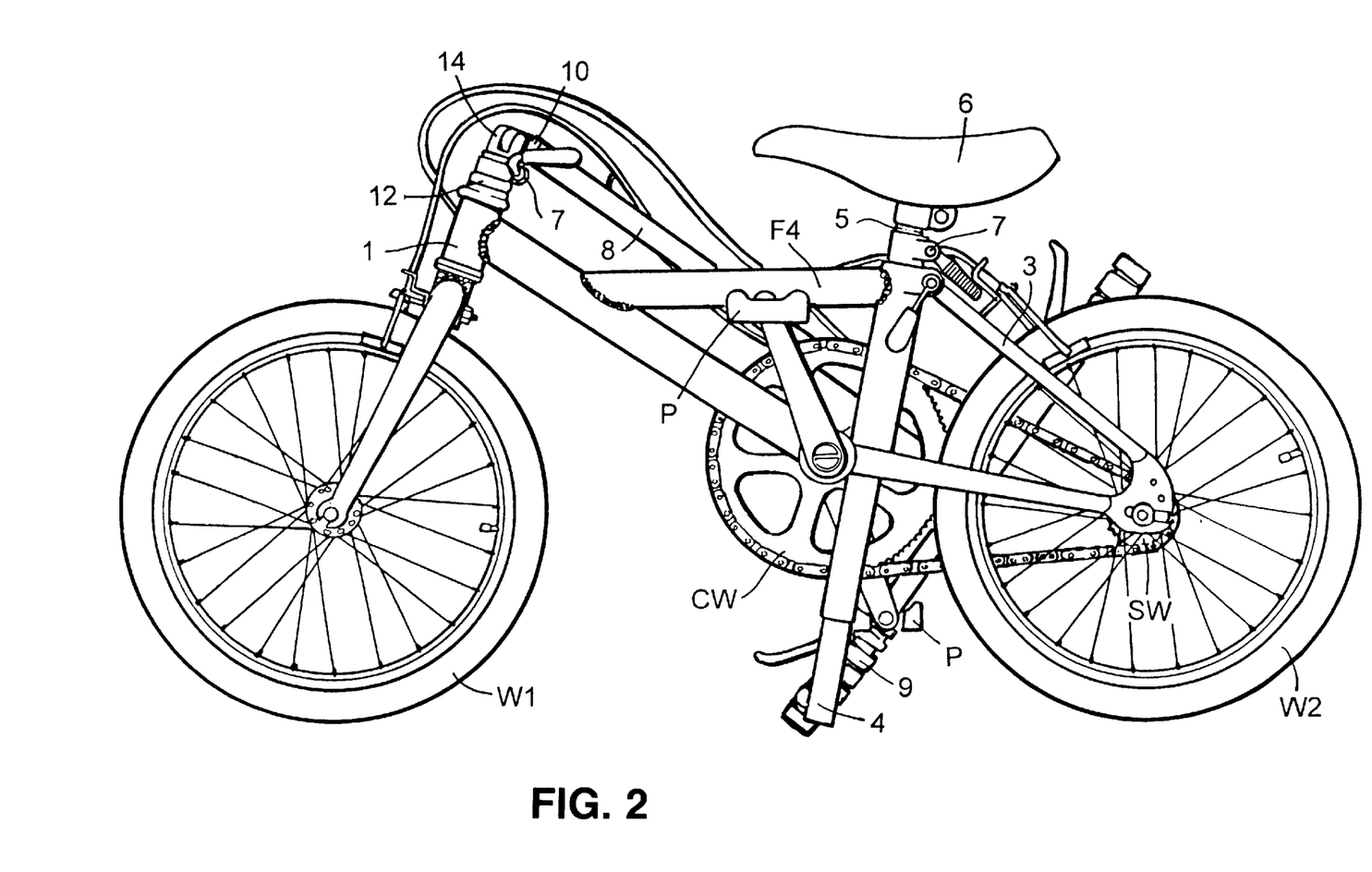
FIG. 2 is a diagrammatic side elevation of the cycle of FIG. 1 in the storage condition.
Figures 4, 4A:
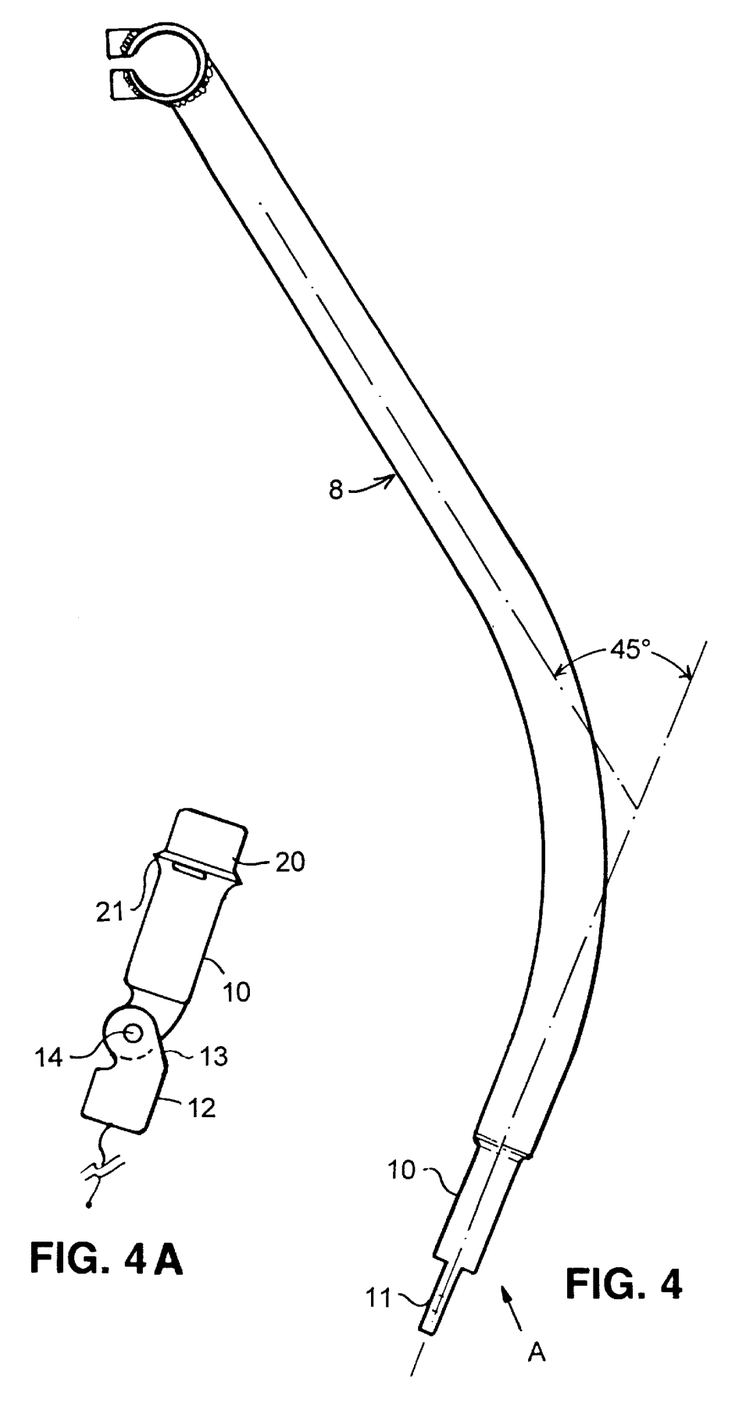
FIG. 4 is a side elevation of the head tube.
FIG. 4a is an elevation, taken in direction A on FIG. 4 showing the lower pivot portion of the head tube assembly.

The head tube assembly F2 which is shown in detail in FIG. 4 comprises a gently curved or cranked length of metal tube 8 having an outer diameter similar to that of the stem 16 (FIG. 5) of the front fork assembly 15, except for at its lower end. The handlebars 9 are fixed to the top of the head tube 8. As shown in FIG. 2, 4 and 4a, the lower end of the tube 8 is reduced in diameter to form a length portion 10 having a pivot plate 11 at its free end. A stub 12 having side arms 13 to lie alongside the plate 11 is held on to the plate by a cross pin 14. The stub is a cylindrical body dimensioned to be received as a sliding fit in the stem 16. The pivot is arranged to move across a limited arc but the tube 8 can rotate within the stem 16. In order to prevent complete withdrawal of the stub 12 from socket 1, the former is attached to a flexible steel cord 30 whose free end is expanded and is secured in any suitable aperture (not shown) in socket 1.

As shown in FIGS. 4 and 4A, the reduced diameter portion 10 has an upper reduced diameter portion 20 which fits within the lower end of head tube 8 and is welded thereto in the region of an abutting rib 21.

Figures 5, 5A:
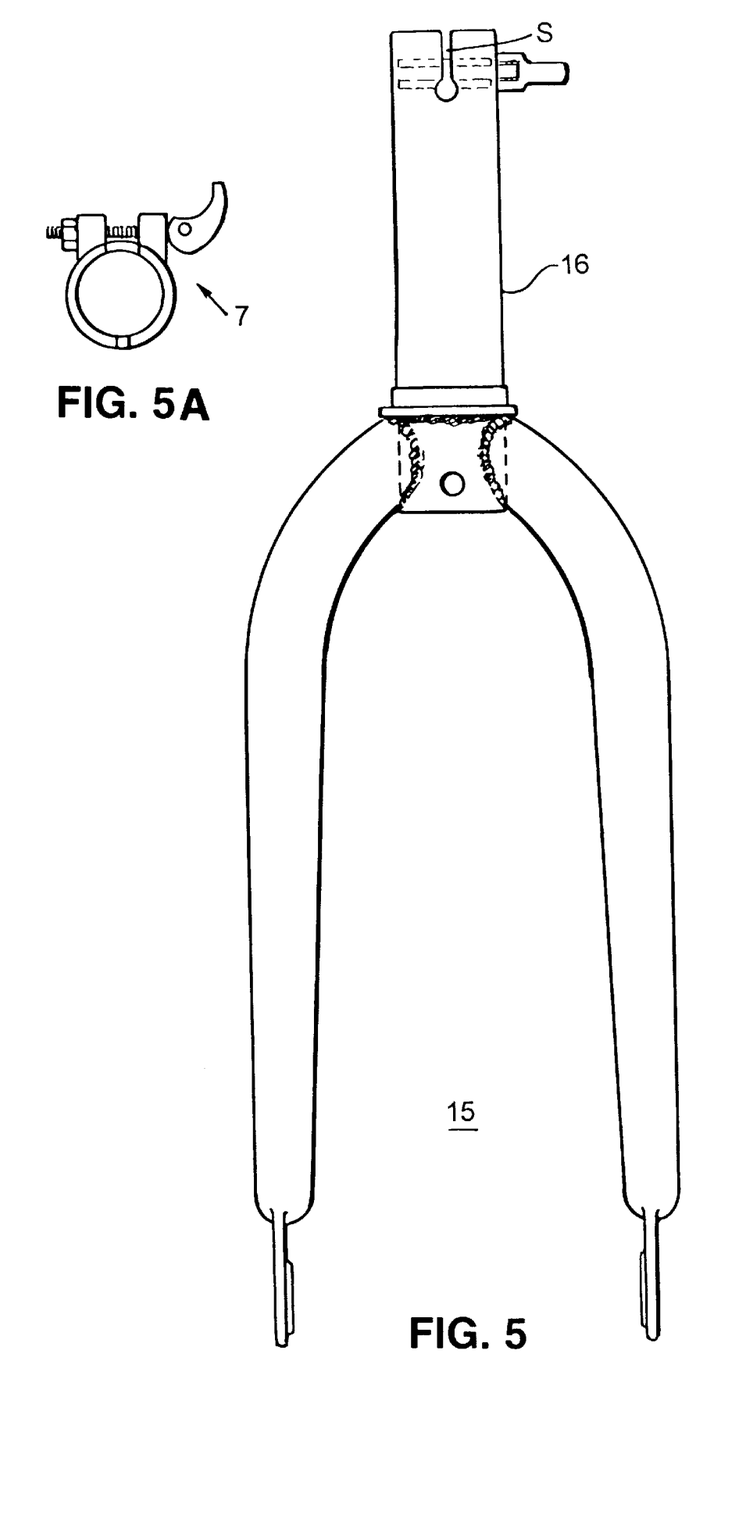
FIG. 5 is a front elevation of the front fork assembly.
FIG. 5A is a plan view of a quick-release clamp

As shown in FIG. 3 the tubular stem 16 of the fork assembly has a bushing 22 secured to its upper end by a nut 23 and a bushing 24 secured to its lower end. These bushings locate the fork assembly in socket 1. As shown in FIG. 5 the upper end of stem 16 is provided with a longitudinal slot 5 and, as shown in FIG. 3, the upper ends of stem 16 are clamped against portion 10 of tube 8 by a quick release clamp 7 (FIG. 5a).

Conventional caliper brakes BR are located in the front of the front fork assembly 15 and at the rear of the stays 3 and are operated in a conventional manner via cables 100 by brake lever assemblies BL on the handlebars 9.

Figure 1:
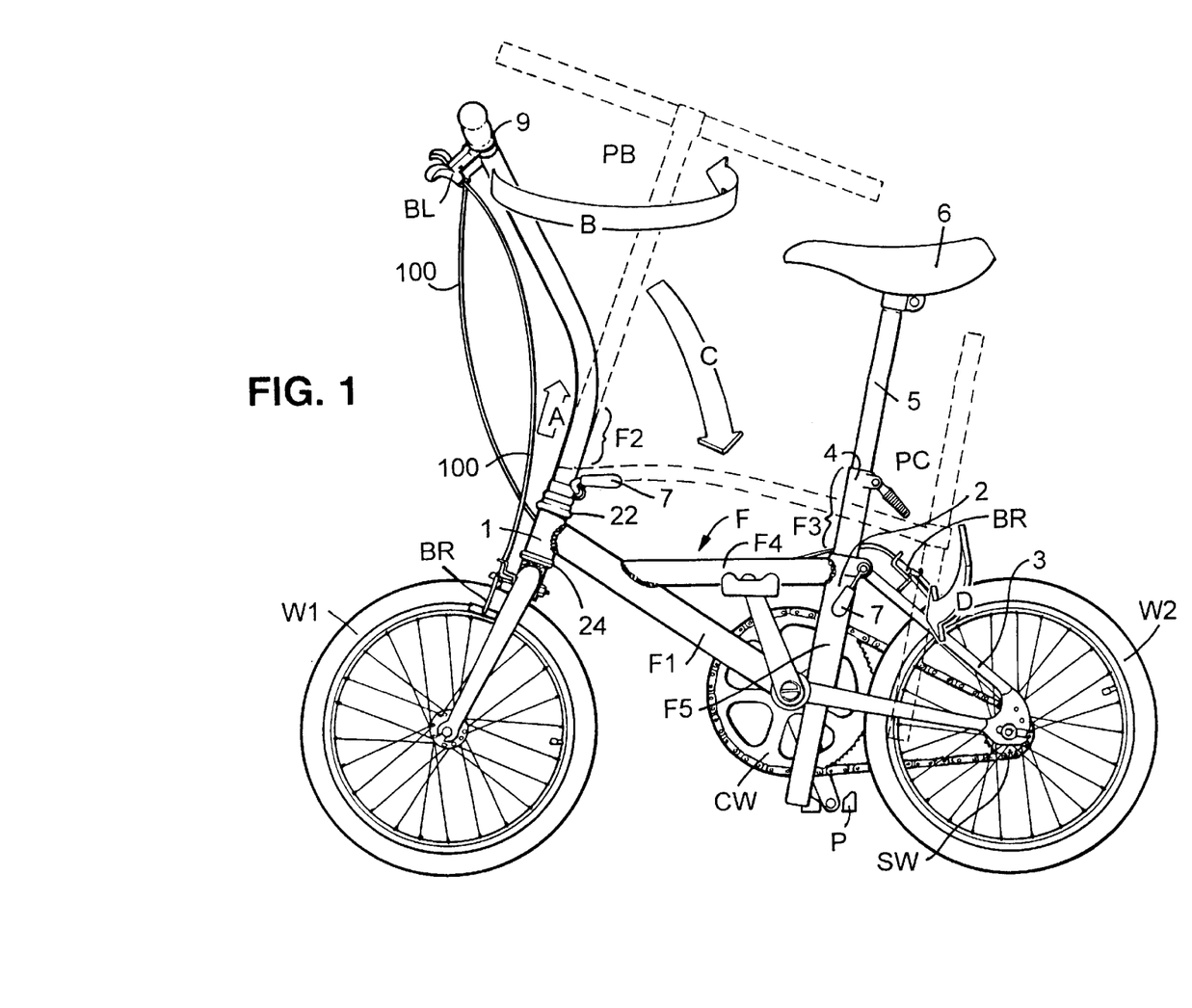
FIG. 1 is a diagrammatic side elevation of one cycle of the invention in the erect or riding condition.

As shown in the condition of FIG. 1 the bicycle may be ridden. The head tube 8 is mounted substantially vertically in the socket 1, the tube being pushed in until the length portion 10 is received in the socket 1, so that the pivot is fixed against angular movement. The tube 8 is locked in position by the clamp 7. The seat post assembly F3 is extended until the seat 6 is at an appropriate height and locked in position using the clamps 7. The bicycle is light weight, yet robust and easy to ride. To collapse the bicycle for storage or transport in say a car boot, the head tube assembly F2 is released from its socket 1 and then raised by longitudinal movement in direction of arrow A to bring the pivot up to the extent that the head tube 8 can be rotated anticlockwise by about 200° as indicated by arrow B so that the handlebars 9 are generally to the right of the frame 1 in position $P_B$. The tube 8 is then tilted down to the left as indicated by arrow C to pivot about the pivot point, until the tube 8 extends at an angle alongside the left hand side of the frame in position $P_C$. If necessary to bring the handlebars adjacent the seat tube, the head tube assembly is then swung anticlockwise about the longitudinal axis of socket 1 to bring the handlebars 9 against seat tube F5. The seat tube assembly F3 is telescoped and pushed down until the lower end of the tube 4 extends through the socket 2 and abuts the floor. The clamps 7 are then engaged to lock the parts in position. The bicycle is most compact when collapsed and yet is easily brought to full size for riding. No special tools are needed.

Preferred dimensions are shown in FIGS. 3, 4, 4a and 5.

The invention is not limited to the embodiment shown. The bicycle frame may be made in a variety of materials, e.g. steel or polished aluminium. Gears may be present.

I claim:

1. A collapsible cycle frame assembly comprising:
    a) a front fork assembly having front forks and a tubular stem extending upwardly from said front forks, said tubular stem comprising a first tubular socket for slidably receiving a head tube assembly;
    b) a frame, said frame comprising an inclined down tube, said down tube having a forward upper end connected to a generally upright tube for receiving said stem of said front fork assembly and having a rearward lower end connected to a generally upright seat tube, said seat tube comprising a second tubular socket for receiving a seat post assembly;
    c) a head tube assembly having first and second ends and a length adjacent said first end which is slidably receivable in and clampable in said first tubular socket, said length including a pivot joint, and
    d) first releasable clamping means for releasably clamping said length in said first tubular socket, said head tube assembly being upwardly slidable to a position in which said pivot joint is lifted out of said first tubular socket on releasing said first releasable clamping means.

2. A collapsible cycle frame assembly according to claim 1, wherein the range of pivoting of said pivot joint is sufficient to enable the head tube assembly to incline downwardly to extend generally alongside said down tube when said pivot joint is lifted out of said second tubular socket.

3. A collapsible cycle frame assembly according to claim 2, wherein said head tube assembly carries handlebars at said second end and the distance between said pivot joint and said second end is substantially equal to the length of said down tube.

4. A collapsible cycle frame assembly according to claim 1, wherein said releasable clamping means extends circumferentially around said tubular stem.

5. A collapsible cycle frame assembly according to claim 4, wherein said releasable clamping means comprises carrying means for circumferentially tightening the clamping means around said tubular stem, said carrying means being coupled to a quick release lever.

6. A collapsible cycle frame assembly according to claim 1, wherein said length is rotatable in said first tubular socket on releasing said releasable clamping means for enabling the head tube assembly to be swung toward a side of said frame after being swung downwardly about said pivot joint.

7. A collapsible cycle frame assembly according to claim 1, wherein said head tube assembly is curved between said length and said second end and the cycle frame assembly has a riding configuration in which said second end is forwardly inclined.

8. A collapsible cycle frame assembly according to claim 6, wherein said head tube assembly is curved between said length and said second end and the cycle frame assembly has a riding configuration in which said second end is forwardly inclined.

9. A collapsible cycle frame assembly according to claim 1, wherein said seat tube has an open lower end for enabling a seat post assembly to protrude downwardly therefrom in a collapsed configuration of the cycle frame assembly.

10. A collapsible cycle frame assembly according to claim 1, further comprising a seat post assembly, said seat post assembly comprising an upper length of tubing telescopically received within a lower length of tubing, said lower length being received within said second tubular socket, second releasable clamping means for releasably securing said second length to said first length and third releasable clamping means for releasably securing said lower length in said second tubular socket.

11. A collapsible cycle comprising a cycle frame assembly as claimed in claim 1, a front wheel mounted in said fork assembly, handlebars mounted on said second end of said head tube assembly, a rear wheel mounted on said frame rearwardly of said seat tube, chainwheel drive means coupled to said rear wheel, pedalling means mounted on said chainwheel drive means and a seat post assembly mounted in said second socket, said seat post carrying a saddle.

12. A collapsible cycle frame assembly comprising:
a) a frame, said frame comprising an inclined down tube, said down tube having a forward upper end connected to a generally upright tube for receiving a stem of said front fork assembly and having a rearward lower end connected to a generally upright seat tube, said seat tube comprising a tubular socket for receiving a seat post assembly;
b) a seat post assembly having first and second ends and a length adjacent said first end which is slidably receivable in and clampable in said tubular socket, said length including a pivot joint, and
c) releasable clamping means for releasably clamping said length in said tubular socket, said seat post assembly being upwardly slidable to a position in which said pivot joint is lifted out of said tubular socket on releasing said releasable clamping means.

13. A collapsible cycle comprising:
a) a front fork assembly having front forks and a tubular stem extending upwardly from said front forks, said tubular stem comprising a first tubular socket for slidably receiving a head tube assembly;
b) a frame, said frame comprising an inclined down tube, said down tube having a forward upper end connected to a generally upright tube for receiving said stem of said front fork assembly and having a rearward lower end connected to a generally upright seat tube, said seat tube comprising a second tubular socket for receiving a seat post assembly;
c) a head tube assembly having first and second ends and a length adjacent said first end which is slidably receivable in and clampable in said first tubular socket, said length including a pivot joint, and
d) first releasable clamping means for releasably clamping said length in said first tubular socket, said head tube assembly being upwardly slidable to a position in which said pivot joint is lifted out of said first tubular socket on releasing said first releasable clamping means;
e) a seat post assembly, said seat post assembly comprising an upper length of tubing telescopically received within a lower length of tubing, said lower length being received within said second tubular socket, second releasable clamping means for releasably securing said second length to said first length and third releasable clamping means for releasably securing said lower length in said second tubular socket, said seat post assembly carrying a saddle;
f) a front wheel mounted in said fork assembly;
g) handlebars mounted on said second end of said head tube assembly;
h) a rear wheel mounted on said frame rearwardly of said seat tube;
i) chainwheel drive means coupled to said rear wheel, and
j) pedalling means mounted on said chainwheel drive means.

* * * * *

UNITED STATES PATENT AND TRADEMARK OFFICE
CERTIFICATE OF CORRECTION

PATENT NO. : 5,947,500
DATED : September 7, 1990
INVENTOR(S) : Damian McGrane

It is certified that error appears in the above-identified patent and that said Letters Patent is hereby corrected as shown below:

On the title page, item [73], insert the following:

--Assignee: Daewoo U.K. Limited

South Harow,
Great Britain

Signed and Sealed this

Seventh Day of December, 1999

Attest:

Q. TODD DICKINSON

*Attesting Officer*     *Acting Commissioner of Patents and Trademarks*